Jan. 28, 1969    W. M. MARLEY ET AL    3,424,200
NON-CAVITATING DISC VALVE
Filed Nov. 4, 1966
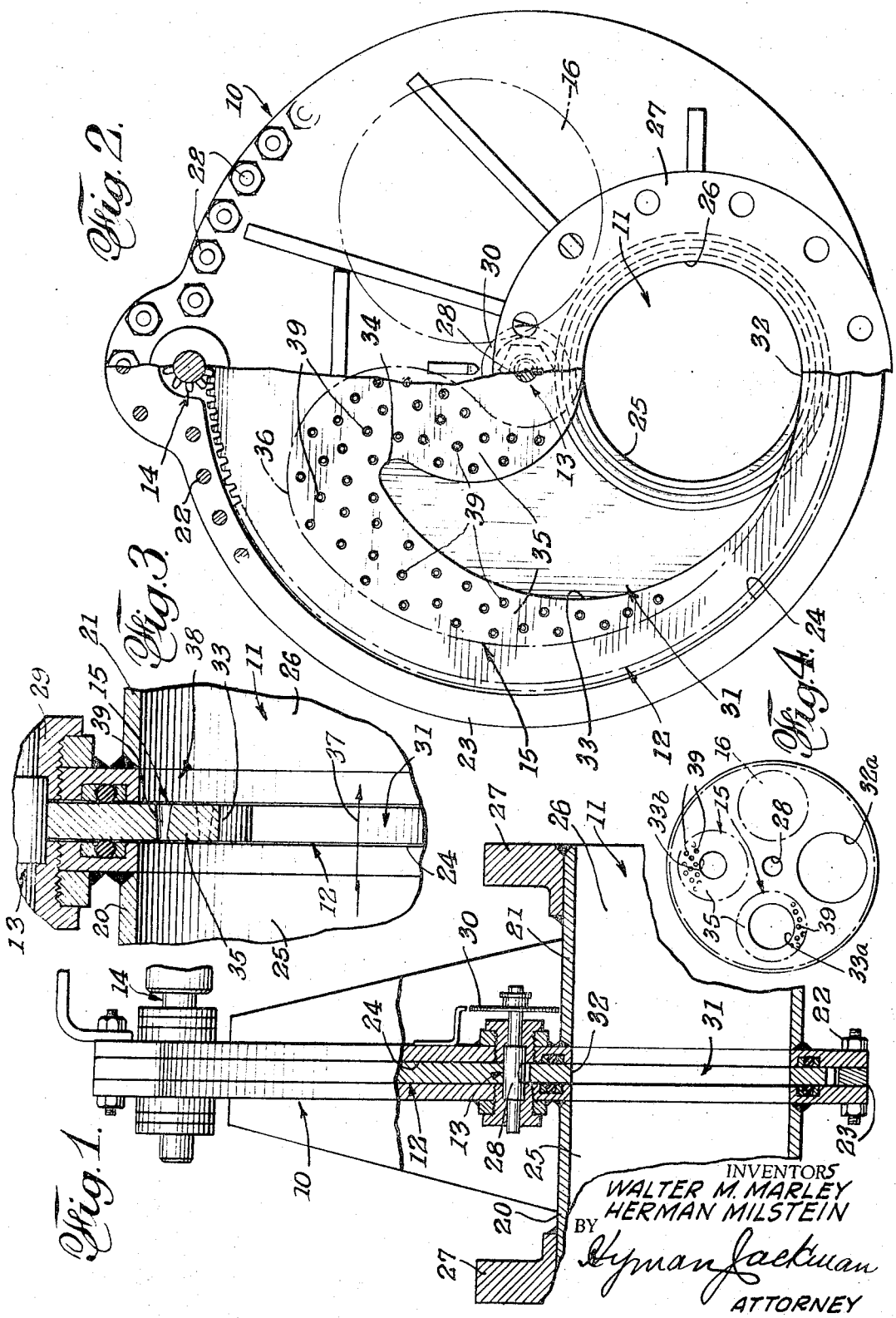
INVENTORS
WALTER M. MARLEY
HERMAN MILSTEIN
BY Hyman Jackman
ATTORNEY United States Patent Office 3,424,200
Patented Jan. 28, 1969

3,424,200
NON-CAVITATING DISC VALVE
Walter M. Marley, Monterey Park, and Herman Milstein, Los Angeles, Calif., assignors to Roto-Disc Valve Company, Los Angeles, Calif., a corporation of California
Filed Nov. 4, 1966, Ser. No. 592,173
U.S. Cl. 137—625.31                9 Claims
Int. Cl. F16k 3/00

ABSTRACT OF THE DISCLOSURE

The present valve incorporates a novel feature: that of obviating cavitation causing erosive damage to both the disc and the valve body. This undesirable wear on the valve parts occurs when the disc is rotationally adjusted to a position intermediate full flow and non-flow. The inventive concept comprises the provision, in a valve of the character disclosed in said application, of a plurality of auxiliary orifices preferably arranged in a pattern adjacent the gradually tapered port in the valve disc, the same providing an auxiliary flow which inhibits formation of vacuum-induced turbulences on the downstream side of the disc, thereby minimizing cavitation effects.

In a modification in which the tapered port is replaced by a group of differently sized ports arranged concentrically around the axis of rotation of the disc, such cavitation-inhibiting orifices may be arranged around those of said ports that are smaller than the flow passage of the body.

Brief summary of the invention

The prior art presently known to the applicants comprises the following United States patents: 2,950,896, Aug. 30, 1960; 2,994,344, Aug. 1, 1961; 3,003,468, Nov. 1, 1962; and 3,118,472, Jan. 21, 1964.

None of the above patents discloses valve discs having a tapered port or a set of differently-sized ports which regulate flow through the valve according to the adjusted position of the valve disc relative to the flow passage through the valve body. Applicants' earlier-filed application, mentioned above, discloses such a disc valve, the same having greater pertinence to the present invention than do the listed patents, in that the same constitutes a valve structure on which the present improvements may be based.

The formation of partial vacuum in a liquid as a result of the passage through it of a swiftly moving solid body is one definition for cavitation; another is the pitting and wearing away of solid surfaces as a result of the collapse of these vacuums. These definitions have basis, therefore, on the swift relative movement of a liquid and a solid body. Thus, these definitions may be applied to the effects produced on the downstream side of a disc valve when the disc thereof is set so that its port will restrict the flow to a size smaller than the flow passage through the valve. Thus, cavitation will result in the valve of said application due to swift water moving in the valve passage to produce partial vacuums on the downstream side of the ported disc, the same pitting the surfaces of the disc and the walls of the valve passage as a result of the collapse of these vacuums.

This problem has been solved, in this case, by directing a small portion of the flowing liquid through orifices in the disc to the downstream side of the disc and into such partial vacuums. The metering properties of the valve may be readily retained by providing that the adjusted flow comprises the flow through the port plus the auxiliary flow, it being an object of this invention to provide a flow-controlling valve disc of the character above referred to.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the folowing description merely describes, preferred embodiments of the present invention, which are given by way of illustration or example only.

Detailed description of the invention

In the drawing, like reference characters designate similar parts in the several views.

FIG. 1 is a cross-sectional view, partly in edge elevation, of a disc valve embodying the present invention, the valve being shown fully open.

FIG. 2 is a partial side view and partial sectional view on a plane normal to the valve shown in FIG. 1.

FIG. 3 is an enlarged fragmentary sectional view of the middle portion of FIG. 1, with the flow-controlling disc adjusted to a flow-limiting position.

FIG. 4, to a reduced scale, shows a modified form of the invention.

The valve that is illustrated in FIGS. 1, 2 and 3 comprises, generally, a body 10 provided with a flow passage 11, a valve disc 12 housed in said body and mounted on an axis 13 on which the same is rotatable, means 14 for rotating the disc, and means 15 to obviate cavitating effects on the downstream side of the valve disc when said disc is adjusted to a position intermediate fully open, as shown in FIGS. 1 and 2, and fully closed, as when the disc is adjusted to bring the portion 16 of the disc into register with the flow passage 11.

The body 10 is shown in two similar parts or halves 20 and 21 that are joined by means such as bolts 22 along a medial joint 23, an inner space 24 being provided to accommodate the disc 12. Said body halves 20 and 21 are provided with aligned ports 25 and 26 that combine to form the flow passage 11. Flanges 27 on said body halves, around the ports 25 and 26, in the usual way are connectable to mating flanges on a flow line or conduit in which the body 10 is connected.

The above-described body 10 is generally circular, with the axis 13 at the center thereof and the passage offset between said axis and the periphery of the body. The means 14 is preferably located, as shown, at the disc periphery.

The disc 12 is circular and is affixed to an axis 28 on the axis 13, the same having bearing at 29 in the body halves on opposite sides of the space 23 in the body. An extension on said axle is provided with an index 30 by means of which the adjusted position of the disc around the axis 13 may be gauged.

Port means, in this form, comprises a port 31 provided in the disc 12, said port comprising a partly circular portion 32 of the same size as and in registering relation to the ports 25 and 26 of the passage 11, and a gradually tapering portion 33 that follows an arcuate path generated on the axis 13. The mentioned disc portion 16 is located between the port portion 32 and the smaller end 34 of the tapering port portion 33.

The port 31 has its largest end opening 32 about the same size as the passage 11 and connects the ports 25 and 26 of said passage. It will be clear that the full flow through passage 11 is had when said largest opening 32 is aligned with the passage, as shown, and that, by rotating the disc 12 in a counter-clockwise direction, as seen in FIG. 2, the flow in said passages is gradually reduced as successively narrower or smaller portions of said port become aligned with the passage 11. Full shut-off is obtained upon register of portion 16 of the disc with the passage 11.

In any intermediate adjusted position as, for instance, in FIG. 3, a portion 35 of the disc 12 around the tapering portion 33 of the port 31 will extend into the valve passage 11 and across the path of water flow through said passage. This portion 35 is shown defined by a circumscribing line 36 and is uniform in width to the diameter of the port portion 32. It will be seen, therefore, that this flow-reducing portion increases in size in inverse relation to the decrease of the tapering port portion 33.

With the flow in the direction of the arrow 37, the areas 38 on the downstream side of the passage 11, as explained hereinabove, will be subject to cavitation, i.e., formation of partial vacuums as the flow passes through the restricted port portion 33.

The present means 15 comprises a plurality of small, preferably flared orifices 39, dispersed throughout the area of the portion 35 of the disc; the same, by passing an auxiliary flow from the upstream to the downstream side of the disc, enters said areas 38 and either reduces or completely eliminates cavitation effects by reducing or eliminating eddies and other turbulences in said areas 38. As a result of such smoothening of the flow, the objects of the invention are realized.

The objects of the invention are also realized in a valve that has the disc 12a of FIG. 4, wherein the port means comprises a group or set of three ports 32a, 33a and 33b arranged concentrically around the axle 28. Port 32a is the same size as the passage 11; therefore, it has the same function as the portion 32 of the port 31. The ports 33a and 33b are successively smaller than port 32a and each is surrounded by a plurality of orifices 39 in areas 35, as in the disc 12. Said orifices 39 provide the mentioned auxiliary flow through the disc when either of the smaller ports 33a or 33b is in register with the flow passage 11. The number of such ports of reduced size may be varied as desired.

It will be understood that but a small portion of the total flow passes through the orifices 39, the percentage thereof varying in proportion to the effective area of the port portion 33 and the area of the orifices. A ratio of one to fifty may be used as exemplary of such main and auxiliary flow proportions.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. In a non-cavitating disc valve having a body with an axial center and provided with a transverse flow passage offset from said center, with a circular inner space opening on and intersecting said passage, (a) a circular disc fitted in said space mounted on an axle at said body center to be rotatable in said circular space, (b) port means in said disc offset from the axle of the disc similarly to the offset of the passage from the body center, a first portion of said port means being the same size as said flow passage, and, when in register therewith, providing full flow therethrough and through said passage, a second portion of said port means connected to said first portion of said port means being smaller than said first port portion and, when in register with the flow passage, restricting flow therethrough and to the downstream side of the flow passage, and (c) a plurality of orifices in the portions of the disc around and adjacent the mentioned smaller port portions to provide a cavitation-reducing flow therethrough that is auxiliary to the flow through the latter port portions, when the disc is rotatably adjusted to position said latter port portions in register with said flow passage.

2. In a non-cavitating disc valve according to claim 1, the orifices being substantially smaller than the smallest port portions around which they are provided.

3. In a non-cavitating disc valve according to claim 2, the orifices being flared from the upstream to the downstream side of the disc.

4. In a non-cavitating disc valve according to claim 1, the mentioned port means comprising a gradually tapered port from an end thereof of the same size as the passage in the body, and the orifices being arranged in a pattern that is of uniform outer size equal to the size of the mentioned passage.

5. In a non-cavitating disc valve according to claim 4, the area of the disc provided with the orifices increasing toward the smallest end of the port.

6. In a non-cavitating disc valve according to claim 1, the mentioned port means comprising a port of the same size as the passage in the body, and at least one smaller port, and the orifices being arranged around the smaller port in a pattern having an outer size equal to that of the mentioned passage.

7. A disc for a non-cavitating disc valve provided with port means having a large portion and a smaller portion, said portions being connected, and a group of orifices around the smaller port portion to pass a portion of the flow, from one side of the disc to the other, that is auxiliary to the flow through the smaller port portion.

8. A valve disc according to claim 7, in which the port means comprises a tapered port in which the orifices are provided around the tapered portion of the port.

9. A valve disc according to claim 7, in which the port means comprises at least two ports, one smaller than the other, and in which the orifices are provided around the smaller port.

References Cited

UNITED STATES PATENTS

| | | | |
|---|---|---|---|
| 1,813,100 | 7/1931 | Swindle | 251—208 X |
| 2,498,396 | 2/1950 | Cunningham | 251—301 X |
| 2,858,847 | 11/1958 | Collins | 251—208 X |

ARNOLD ROSENTHAL, *Primary Examiner.*

U.S. Cl. X.R.

251—208, 302